United States Patent Office 3,720,185
Patented Mar. 13, 1973

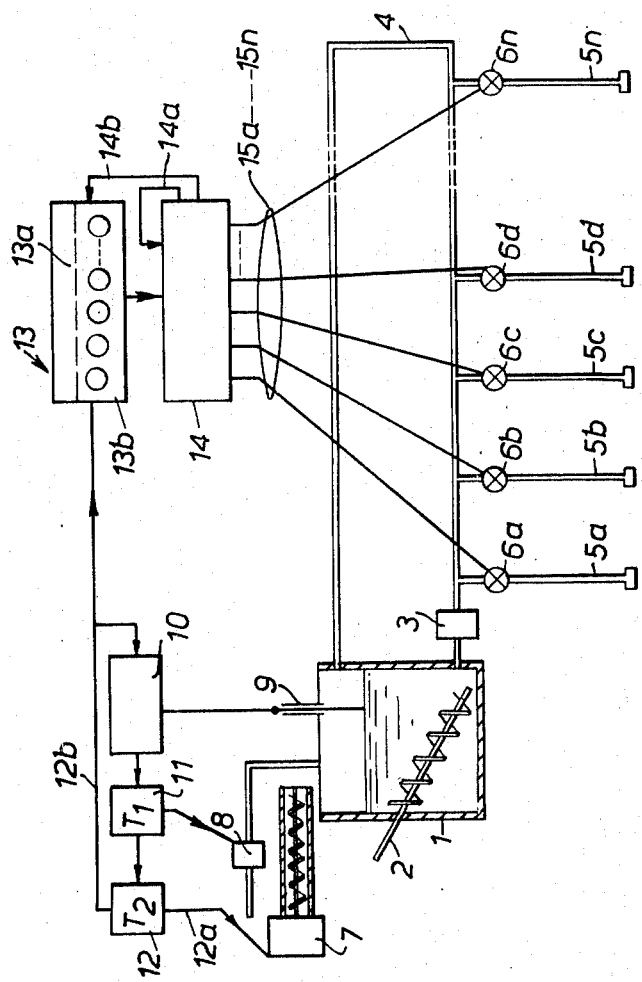

3,720,185
MIXING AND SUPPLY ARRANGEMENT FOR FEEDING LIQUID FEEDSTOCK
Maurice William Aldous, 73/75 High St., Bildeston, Ipswich, England, and John Clement Hitchcock, Chapel Farm, Ringshall, Stowmarket, England
Filed Oct. 26, 1970, Ser. No. 83,962
Int. Cl. A01k 5/02
U.S. Cl. 119—51.11
8 Claims

ABSTRACT OF THE DISCLOSURE

Liquid food material for livestock is automatically fed to a multiplicity of deliver points by a mechanism operating cyclically in which each cycle involves the introduction of a given amount of solids and delivery is continued for a number of cycles sufficient to deliver sufficient solid material to the delivery points.

---

This invention relates to a mixing and supply arrangement for feeding liquid feedstock.

A problem in the feeding of liquids to animals under farm conditions is the assessment of the amount of solid material fed in a given quantity of liquid. The invention proposes a method of mixing and supplying a liquid feedstock which enables sufficiently accurate monitoring of solids without the need to use flowmeters or similar equipment.

According to the present invention liquid and solid components are fed to a mixing vessel in preset increments in an operating cycle which is initiated each time the contents of the vessel fall below a given level, and mixed feedstock is removed from the vessel for a period occupied by that number of cycles which when multiplied by the incremental amount of solid component gives a product equal to the desired amount of solid component.

The invention therefore provides apparatus for mixing and supplying liquid feedstocks which comprises a mixing vessel provided with level sensing means, delivery means for delivering liquid and solid components to the mixing vessel, control means operated by the level sensing means whereby the delivery means are operated in a cycle which delivers a presettable increment of each component to the vessel each time the level of the contents fall below a level defined by the sensing means, and one or more feeding points from which the contents of the mixing vessel can be dispensed for a period corresponding to the duration of a given number of cycles.

In one embodiment of the invention the outlet from the vessel is connected by pipework to a number of feeding points which are controlled in sequence by a central control unit which permits each point to be fed for a predetermined number of cycles and then steps the feed to the next successive feeding point.

Alternatively the feeding points may be manually controlled, and a flashing light or counter may be provided to enable an operator to open the feeding point for a given number of cycles.

Preferably the pipework incorporates a return run to return feedstock to the mixing vessel, so that a positive displacement pump may be used to pump the feedstock out of the mixing vessel.

The operation of an automatic feeding installation according to the invention may be controlled from a liquid level sensor located in the mixing vessel, the sensor being connected to initiate timed operation of delivery means for the liquid and solid components, and to govern the separation of a bank of selectors and switches which enables the number of cycles allotted to each feeding point to be set and causes corresponding sequential opening of the feeding points. Advantageously the control system is constructed to allow a "warming up" period during which the mixing vessel can fill and the pipework can clear itself of air pockets or blockages before feeding proper starts.

The invention will now be described in greater detail with reference to the accompanying drawings, of which the sole figure is a schematic representation of a pig-feeding unit operated in accordance with the invention.

The drawing shows a mixing tank 1, having an auger mixer 2 and provided at its lower end with a positive displacement auger pump 3. The discharge of the pump 3 is connected to a loop of piping 4, of 2" internal diameter, which returns to the upper end of the tank 1. A number of feed pipes 5a ... 5n branch from the pipe 4, and are controlled by respective valves 6a ... 6n. Solid feed material is supplied to the mixing tank 1 from bulk supply via an auger feed unit 7, and water is pumped in by a pump 8.

The top of the mixer tank 1 is equipped with a liquid level probe 9 connected to an electronic relay 10. Whenever the probe is clear of the liquid surface in the tank, the relay 10 starts a cycle which energises a first timer 11. This timer operates the pump 8 for a preset time, which allows a corresponding amount of water, say 1 gallon, to enter the tank 1. At the end of this time, the output of timer 11 sets a second timer 12 into operation, and this acts on line 12a to cause the auger feed unit 7 to operate for a preset time to feed a corresponding amount of meal, say 4 lbs., to the tank. At the end of the feed of the meal, a signal on lead 12b from the timer 12 causes the relay 10 to reset and terminate the cycle and also initiates operation of a selector and switching unit 13. The unit 13 governs the number of cycles of the relay 10 during which any one of the valve 6 is open. The portion 13a represents a uniselector which is energised to step round by one step at the termination of each cycle of the relay 10, and the fixed contacts of this uniselector are wired in parallel to corresponding fixed contacts in a bank of rotary selector switches 13b corresponding to the feeding points 5a ... 5n. The wipers of the switches 13b are connected to corresponding contacts of a first bank of a second uniselector 14 whose second bank is connected on lines 15a ... 15n to solenoids (not shown) controlling the operation of the valves 6, thus selecting the feeding point 5 which is to be operative. The arrangement is such that if the selector switch 13b for a given feeding point 5j is set to x units, the selector 13a will step round until that selector switch connects the uniselector wiper to the wiper of the first bank of uniselector 14 corresponding to feeding point 5j. During this time, corresponding to x cycles of the relay 10, the second bank of uniselector 14 will hold valve 6j open. Then, the first bank of uniselector 14 will step itself on (on line 14a) to energise the valve 6j+1, and pass a signal on line 14b to reset uniselector 13 to its starting position, after which the cycling of relay 10 will repeat until uniselector 13 reaches the position corresponding to the number of cycles on the selector switch for feeding point 5j+1. At the end of a complete operation, when feedstock has been delivered to all the feeding points 5, the system is arranged to set both uniselectors to their starting positions.

From the setting of delivery rates of the auger 7 and pump 8, and the rate of pump 3, it can be ensured that the delivery is finished more quickly than the pumping out, whereby it is ensured that the arrangement operates in increments of 4" of dry meal. It is thus known that a delivery corresponding to n cycles of the relay 10 gives a feed of 4n lbs. of meal at the corresponding feeding point 5. Thus by simply setting the selector switches 13b, all feeding points 5 can receive feedstock equivalent to any present multiple of 4 lbs. of dry meal.

In starting up the equipment, it is arranged that a period of 30 seconds elapses between starting up of the apparatus and the opening of valve 5a, to ensure that the tank 1 is full and that the piping 4 is free from air or blockages.

It will be appreciated that the rates of supply of the feedstock components may be freely varied, and that automatic starting of the equipment can be provided for. It is also possible to provide a delay between opening of the successive valves 6, so that an operative can move from one feeding point 5 to another to check on the operation of the system or the state of the animals as they are fed.

Although the embodiment described is fully automatic, it is possible to use the invention with manually controlled valves 6 so long as an indication of the number of cycles is provided by means such as a flashing light or a counter, energised from the timer 12 and visible from the valve position.

We claim:

1. An automatic liquid animal feeder, comprising in combination
   (a) a mixing chamber,
   (b) delivery means for delivering to said mixing chamber liquid and solid materials in desired proportions,
   (c) an output pump connected to pump mixed foodstuff from said mixing chamber to a utilisation area comprising a plurality of feeding points, and
   (d) control means actuated by level sensing means responsive to the level in said mixing chamber only and controlling not only the amount of said liquid and solid materials delivered into said mixing chamber, but also the amount of said mixed foodstuff pumped from said mixing chamber by said output pump.

2. An automatic liquid animal feeder according to claim 1 in which said control means is operative to control said delivery means to operate cyclically and deliver to said chamber a given quantity of foodstuff per cycle.

3. An automatic liquid animal feeder according to claim 2 wherein said level sensing means is connected to cause operation of said delivery means for a pre-set time when the contents of said mixing chamber has fallen to a datum level.

4. An automatic liquid animal feeder according to claim 1 wherein said level sensing means is connected to a uniselector arrangement which in turn serves to effect sequential opening of said feeding points.

5. An automatic liquid animal feeder according to claim 1 wherein each feeding point includes a solenoid-controlled, pneumatically-actuated valve.

6. An automatic liquid animal feeder according to claim 1 wherein said output pump has an output connected to a loop of piping which returns to said mixing chamber and wherein control means are provided whereby the output of said pump is recirculated to said mixing chamber through said loop before a feeding operation is begun.

7. An automatic liquid animal feeder according to claim 2 wherein said control means includes selector means controlling the number of cycles of operation required to feed a required quantity of foodstuff to said utilisation area.

8. An automatic liquid animal feeder according to claim 7 wherein said utilisation area comprises a plurality of feeding points and said selector means includes a corresponding plurality of selectors adjustably controlling feeding of foodstuff to each of the feeding points individually.

References Cited
UNITED STATES PATENTS

| | | | |
|---|---|---|---|
| 3,265,036 | 8/1966 | Kloss | 119—51 |
| 3,192,902 | 7/1965 | Gammill | 119—51.11 |
| 3,331,357 | 7/1967 | Legrain et al. | 119—71 |
| 3,208,431 | 9/1965 | Kloss | 119—51.11 |
| 3,313,272 | 4/1967 | Moloney | 119—51.11 |
| 3,204,607 | 9/1965 | Arnold et al. | 119—51.11 |
| 3,352,286 | 11/1967 | Pickelsimer | 119—51.11 |

ALDRICH F. MEDBERY, Primary Examiner

UNITED STATES PATENT OFFICE
CERTIFICATE OF CORRECTION

Patent No. 3,720,185         Dated March 13, 1973

Inventor(s) MAURICE WILLIAM ALDOUS and JOHN CLEMENT HITCHCOCK

It is certified that error appears in the above-identified patent and that said Letters Patent are hereby corrected as shown below:

[30]   Foreign Application Priority Data
       November 5, 1969   Great Britain .... 54354/69

Signed and sealed this 10th day of July 1973.

(SEAL)
Attest:

EDWARD M. FLETCHER, JR.          Rene Tegtmeyer
Attesting Officer                Acting Commissioner of Patents